United States Patent [19]

Kawabe et al.

[11] Patent Number: 4,681,862

[45] Date of Patent: Jul. 21, 1987

[54] ELECTRICALLY INSULATING FILLER FOR SHEATHED HEATERS

[75] Inventors: Tadashi Kawabe; Masafumi Kobune, both of Ako, Japan

[73] Assignee: Tateho Kagaku Kogyo Kabushiki Kaisha, Japan

[21] Appl. No.: 815,633

[22] Filed: Jan. 2, 1986

[30] Foreign Application Priority Data

Mar. 19, 1985 [JP] Japan .................................. 60-56413

[51] Int. Cl.[4] .................................................. C04B 35/02

[52] U.S. Cl. ................................. 501/108; 106/288 B; 106/306

[58] Field of Search ..................... 501/108; 106/288 B, 106/306

[56] References Cited

U.S. PATENT DOCUMENTS

| | | | |
|---|---|---|---|
| 2,285,952 | 6/1942 | Vogel et al. | 501/108 |
| 3,457,092 | 7/1969 | Tervo | 501/106 |
| 3,583,919 | 6/1971 | Balint et al. | 501/122 |
| 3,622,755 | 11/1971 | Vedder . | |
| 3,991,005 | 11/1976 | Wallace | 106/DIG. 1 X |
| 4,268,320 | 5/1981 | Klingaman et al. | 106/288 B |
| 4,280,932 | 7/1981 | Broom et al. | 252/521 |
| 4,435,693 | 3/1984 | Johnson | 338/238 |

FOREIGN PATENT DOCUMENTS

| | | | |
|---|---|---|---|
| 2313836 | 12/1976 | France . | |
| 60-42272 | 3/1985 | Japan | 106/288 B |
| 1114550 | 5/1968 | United Kingdom . | |

*Primary Examiner*—William R. Dixon, Jr.
*Assistant Examiner*—A. Knab
*Attorney, Agent, or Firm*—Marshall, O'Toole, Gerstein, Murray & Bicknell

[57] ABSTRACT

This disclosure relates to an electrically insulating filler for sheathed heaters. The filler includes globular and nonglobular particles containing at least 95 wt. % MgO, and the percentage of globular particles being at least 5 wt. %. The globular magnesia includes at least one single magnesia or a combination of magnesias selected from groups of sintered magnesias and electro-fused magnesias.

8 Claims, 2 Drawing Figures

ELECTRICALLY INSULATING FILLER FOR SHEATHED HEATERS

FIELD AND BACKGROUND OF THE INVENTION

The present invention relates to sheathed heaters, and more particularly to a filler used as an insulator between a heating wire and a metal outer tube or sheath of a heater for domestic and industrial applications.

It is well known in the prior art that sintered magnesia and electro-fused magnesia are used as an electrically insulating filler for sheathed heaters. Such magnesia products are normally available in the form of particles, and the shapes of such particles are nonglobular, such as prisms and scales. It has been recognized that the use of such materials has the following inherent disadvantages:

(i) In the manufacture of the sheathed heater, it takes a very long time to pack the magnesia particles into the sheath due to their low fluidity, resulting in a low production efficiency.

(ii) It is difficult to achieve a high packing density.

(iii) The inner wall of outer metal sheath and the interior heating wire are frequently damaged by corners and edges of the particles during packing and/or swaging of the sheath.

(iv) Reduction of the particle size in the sheath during swaging of the sheath is not uniform, resulting in uneven electric properties.

SUMMARY OF THE INVENTION

In view of the aforementioned problems, the primary object of the present invention is to provide globular magnesia of high purity, for use as an electrically insulating filler for sheathed heaters.

An electrically insulating filler, in accordance with the invention, for sheathed heaters comprises globular and nonglobular particles, the particles including at least approximately 95% by weight of MgO, and the percentage of globular particles comprising at least approximately 5% by weight.

The aforementioned filler preferably comprises globular particles in the range of approximately 10 to 50% by weight, and the globular magnesia particles, according to the present invention, are preferably composed of at least one single magnesia compound or a combination of magnesia compounds selected from the groups of sintered magnesia and electro-fused magnesia.

The aforementioned mixing ratio of at least approximately 5% by weight of globular particles is important because a lesser per cent by weight does not produce any significant differences in physical properties from the properties of electrically insulating fillers consisting solely of nonglobular particles.

More specifically, the globular particles according to the present invention should be construed as being completely globular particles and also approximately globular particles, and in terms of crystallography, they are single crystals or conglomerates of minute crystals.

Regarding the method for producing such globular particles, the following examples are for production on an industrial scale.

(a) Magnesium hydroxide obtained by reacting sea water or bittern with milk of lime is calcined and pulverized to produce fine powder (mean particle diameter of 44 μm or under). The powder is then granulated into globules by a fluidized bed granulator or a rotary type mixer. The globules are fired at about 1900° C. If bittern is used, the proportion of bittern to milk of lime is 40 to 70% of bittern to 60 to 30% of milk of lime, by volume. If sea water is used, the proportion of sea water to milk of lime is 99.5 to 99.8% of sea water to 0.5 to 0.2% of milk of lime, by volume.

(b) Sintered magnesia clinker (available on the market) and electro-fused magnesia are mixed together, and the mixture is pulverized by a ball mill to produce a fine powder (mean particle diameter of 44 μm or under). The powder is then granulated and heat treated in the manner similar to that of the preceding method. The proportion of magnesia clinker to electro-fused magnesia is optional and not critical and up to 100% of one or the other may be used.

(c) Electro-fused magnesia powder adjusted to size distribution of 63–10 μm beforehand, is subjected to rapid heating to about 2200°–2500° C. by flame spraying and then rapid quenching and solidification.

(d) Sintered magnesia clinker is electrically heated to obtain a melt. The melt is subjected to rapid jet spraying into a refractory vessel with provisions for water cooling, for quenching and solidification.

A variety of analyses made in relation with products according to the present invention revealed that globular particles of magnesia, prepared by any of the above-mentioned methods from (a) through (d), achieve the primary objective of the present invention.

BRIEF DESCRIPTION OF THE DRAWING

The invention will be better understood from the following detailed description taken in conjunction with the accompanying figures of the drawing, wherein.

DETAILED DESCRIPTION OF THE DRAWING

Figure 2:
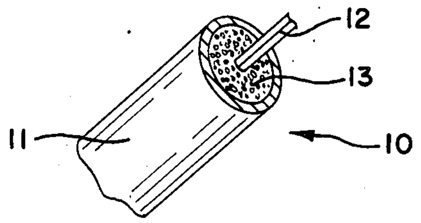
FIG. 2 shows a sheathed heater including a filler according to the invention.

A sheathed heater 10 (FIG. 2) includes a tubular metal sheath 11 which encloses an electric heating wire 12. A filler 13 is disposed in the sheath and around the wire and insulates the wire from the sheath.

In a first preferred embodiment of a filler in accordance with the present invention, sintered magnesia clinker (MgO>98.5 wt. %), which is available on the market, was pulverized, in a ball mill using alumina, into powder having a mean particle size of 44 μm or less. Bittern was added to the powder as a binder, and globular particles were formed by tumbling granulation. These globular particles were heated at 1900° C. for four hours, and particles of 100 mesh size or less were screened and used as the globular particles of magnesia according to this invention.

Next, 20 wt. % of the aforementioned globular particles and 80 wt. % of electro-fused magnesia powder (MgO<97.5 wt. %) consisting of nonglobular particles only, were mixed to form a specimen. The particle size distribution of the specimen is as shown in the attached drawing by the curve marked Embodiment 1 in FIG. 1.

Further, to compare physical properties, a prior art specimen of electro-fused magnesia powder (MgO>97.5 wt. %) was also subjected to measurements of packing density and fluidity. This powder had the same particle size distribution as that of the preferred Embodiment 1 of the drawing and consisted of nonglobular particles only. The results of the measurements for the prior art nonglobular and the Embodiment 1 globular particles are as shown in the following Table 1. For the measurements, a Boeh Model AP901122 tap density measuring device (in accordance with ASTM.D.3477) was used, and the measuring conditions were as follows:

| | |
|---|---|
| Weight of specimen | 100 g |
| Sampling hopper bore | 2.16 mm |
| Rate of tapping | 60 times/min. |

The packing density was calculated from the volume and the weight after completion of the packing. Fluidity was expressed by the time span required for 100 g of the specimen to flow out of the hopper. Each measured value is the mean value of three readings.

TABLE 1

Effects of Globular Particles on the Physical Properties

| Specimen | Item Physical Properties: Packing density (g/cc) | Fluidity (sec/100 g) |
|---|---|---|
| Prior Art | 2.320 | 221.0 |
| Embodiment 1 | 2.450 | 173.1 |

In a second embodiment of the invention, sintered magnesia clinker (MgO<99.0 wt. %) available on the market, was electro-fused in a furnace and the melt was guided to the outlet of the furnace. The melt was then jet sprayed at high velocity into a refractory vessel with water cooling provision by a high speed jet ejector. The magnesia melt was quenched and solidified to form globular particles.

Figure 1:
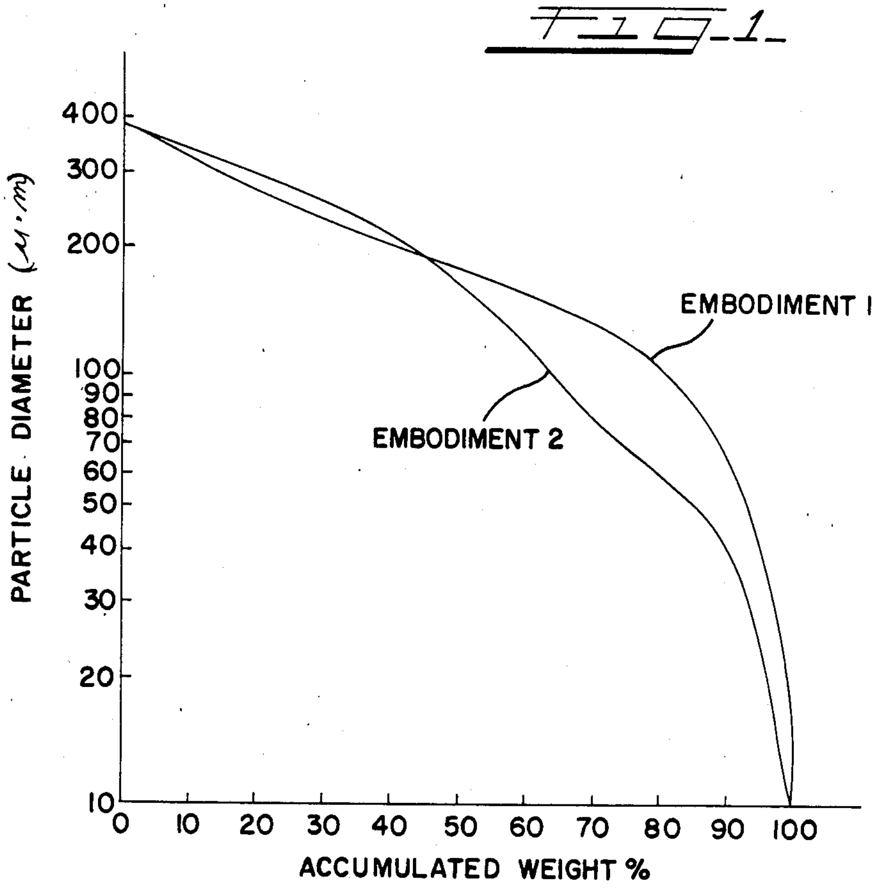
FIG. 1 shows graphs of the particle size distribution of the mixed magnesia powder fillers according to the two preferred embodiments of the invention.

Next, 40 wt. % of the aforementioned globular particles and 60 wt. % of electro-fused magnesia powder (MgO>98.5%) consisting of nonglobular particles only were mixed to prepare a specimen. The particle size distribution of the specimen is as shown in FIG. 1 by the curve marked Embodiment 2. Further, to compare physical properties, a prior art specimen of electro-fused magnesia powder (MgO>98.5 wt. %) was also subjected to the same test measurements of packing density and fluidity, the prior art powder having the same particle size distribution as that of the preferred Embodiment 2 shown in the drawing and consisting of nonglobular particles only. The results of the two sets of measurements are shown in Table 2. The measuring conditions were the same as those of the preferred Embodiment 1.

TABLE 2

Effects of Globular Particles on the Physical Properties

| Specimen | Item Physical Properties: Packing density (g/cc) | Fluidity (sec/100 g) |
|---|---|---|
| Prior art | 2.385 | 247.0 |
| Embodiment 2 | 2.650 | 181.0 |

As clearly demonstrated by the preferred Embodiments 1 and 2, in comparison with the respective magnesia powders of the same particle size distribution but consisting of prior art nonglobular particles only, the specimens having globular particles according to the present invention are far superior in physical properties. In the two preferred embodiments of the present invention, the methods (b) and (d) were used to make the globules. Needless to say, methods (a) and (c) could instead be used with the same results.

It will be clear from the foregoing description that an electrically insulating filler for sheathed heaters according to the present invention, which is characterized in that the globular particles of magnesia account for at least approximately 5 wt. %, and preferably between approximately 10–50 wt. %, eliminates damages to the metal sheath 11 and to the heating wire 12, and allows the use of a high packing density (about 2.40 to about 2.70 g/cc). By allowing predictability in the swaging process, and because of other features, the filler 13 according to the present invention is a valuable industrial material.

What is claimed is:

1. An electrically insulating filler for sheathed heaters, comprising a volume of globular and nonglobular particles containing at least approximately 95% by weight of MgO and said globular particles forming at least 5 wt. % of the volume.

2. An electrically insulating filler for sheathed heaters as set forth in claim 1, wherein said globular particles of MgO comprise at least one single magnesia or a combination of magnesias selected from groups of sintered magnesias and electro-fused magnesias.

3. An electrically insulating filler for sheathed heaters as set forth in claim 1, wherein said filler comprises globular particles in the range of from approximately 10 to 50 wt. %

4. An electrically insulating filler for sheathed heaters, comprising a volume of globular and nonglobular particles containing at least approximately 95% by weight of MgO selected from groups of sintered magnesias and electro-fused magnesias, and said globular particles forming approximately 10 to 50% by weight of the volume.

5. A method of making a sheathed electric heater, comprising the steps of (a) mixing a quantity of globular particles of MgO with a quantity of nonglobular particles of MgO, the globular particles forming at least 5% by weight of the mixture, and (b) filling the mixture into a sheath of an electrical heater.

6. The method of claim 5, wherein the globular particles form from 10 to 50% by weight of the mixture.

7. The method of claim 5, and further including the step of forming said globular particles by sintering magnesia.

8. The method of claim 5, and further including the step of forming said globular particles by electro-fusing magnesia.

* * * * *